United States Patent
Nakajima

(10) Patent No.: US 10,514,698 B2
(45) Date of Patent: *Dec. 24, 2019

(54) ROUTE GUIDANCE DEVICE AND ROUTE GUIDANCE METHOD

(71) Applicant: Nissan Motor Co., Ltd., Yokohama-shi, Kanagawa (JP)

(72) Inventor: Toshiharu Nakajima, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/747,356

(22) PCT Filed: Jul. 27, 2015

(86) PCT No.: PCT/JP2015/071238
§ 371 (c)(1),
(2) Date: Jan. 24, 2018

(87) PCT Pub. No.: WO2017/017761
PCT Pub. Date: Feb. 2, 2017

(65) Prior Publication Data
US 2018/0217604 A1    Aug. 2, 2018

(51) Int. Cl.
*G05D 1/02*    (2006.01)
*G05D 1/00*    (2006.01)
(Continued)

(52) U.S. Cl.
CPC ....... *G05D 1/0214* (2013.01); *G01C 21/3492* (2013.01); *G01C 21/3655* (2013.01);
(Continued)

(58) Field of Classification Search
None
See application file for complete search history.

(56) References Cited

U.S. PATENT DOCUMENTS 5,761,630 A * 6/1998 Sekine .................. B60W 40/04
340/903
8,831,876 B2 * 9/2014 Hayashi ............. G01C 21/3438
340/905
(Continued)

FOREIGN PATENT DOCUMENTS

DE     102004013440 A1    10/2005
EP         1830161 A1     9/2007
(Continued)

*Primary Examiner* — Abdhesh K Jha
(74) *Attorney, Agent, or Firm* — Young Basile Hanlon & MacFarlane, P.C.

(57) ABSTRACT

A route guidance unit includes: a change determination unit configured to determine whether the host vehicle should change the travel lane to another lane so as to travel toward a junction or an intersection on the travel route; a road determination unit configured to determine whether a road between the position of the host vehicle and the junction or the intersection meets road conditions; and a guide unit configured to provide guidance to change lanes, wherein, when the change determination unit determines that the host vehicle should change the travel lane to the other lane, and the road determination unit determines that the road between the position of the host vehicle and the junction or the intersection meets the road conditions, the guide unit changes a point to provide the guidance depending on the road conditions.

3 Claims, 7 Drawing Sheets

(51) Int. Cl.
*G01C 21/34* (2006.01)
*G01C 21/36* (2006.01)
*G08G 1/0969* (2006.01)

(52) U.S. Cl.
CPC ....... *G01C 21/3658* (2013.01); *G05D 1/0088* (2013.01); *G08G 1/0969* (2013.01); *G05D 2201/0212* (2013.01)

(56) References Cited

U.S. PATENT DOCUMENTS

| | | | |
|---|---|---|---|
| 9,079,499 B1* | 7/2015 | Raubvogel | B60K 37/06 |
| 9,316,504 B2* | 4/2016 | Sumizawa | G01C 21/3658 |
| 9,731,724 B2* | 8/2017 | Yoon | B60W 30/18163 |
| 2001/0023380 A1 | 9/2001 | Mizutani | |
| 2006/0031008 A1 | 2/2006 | Kimura et al. | |
| 2010/0246889 A1* | 9/2010 | Nara | G06K 9/00798 |
| | | | 382/104 |
| 2012/0123672 A1* | 5/2012 | Kojima | G01C 21/3658 |
| | | | 701/410 |
| 2013/0030691 A1* | 1/2013 | Sumizawa | G01C 21/3658 |
| | | | 701/410 |
| 2013/0054136 A1* | 2/2013 | Tomita | G01C 21/3629 |
| | | | 701/428 |
| 2015/0166062 A1* | 6/2015 | Johnson | B60W 30/12 |
| | | | 701/41 |
| 2016/0363935 A1* | 12/2016 | Shuster | B60L 7/10 |
| 2017/0018189 A1* | 1/2017 | Ishikawa | G05D 1/0214 |
| 2017/0076598 A1* | 3/2017 | Scofield | G08G 1/0112 |
| 2017/0138752 A1* | 5/2017 | Mermelstein | G08G 1/167 |
| 2018/0037223 A1* | 2/2018 | Goto | B60W 30/08 |
| 2018/0099676 A1* | 4/2018 | Goto | B60W 30/18163 |

FOREIGN PATENT DOCUMENTS

| | | |
|---|---|---|
| JP | 2001255937 A | 9/2001 |
| JP | 2006023278 A | 1/2006 |
| JP | 2008058172 A | 3/2008 |
| JP | 2009133801 A | 6/2009 |
| JP | 2010230556 A | 10/2010 |
| JP | 2012107894 A | 6/2012 |
| JP | 2013113701 A | 6/2013 |
| JP | 2014089131 A | 5/2014 |
| JP | 5637381 B2 | 12/2014 |

* cited by examiner

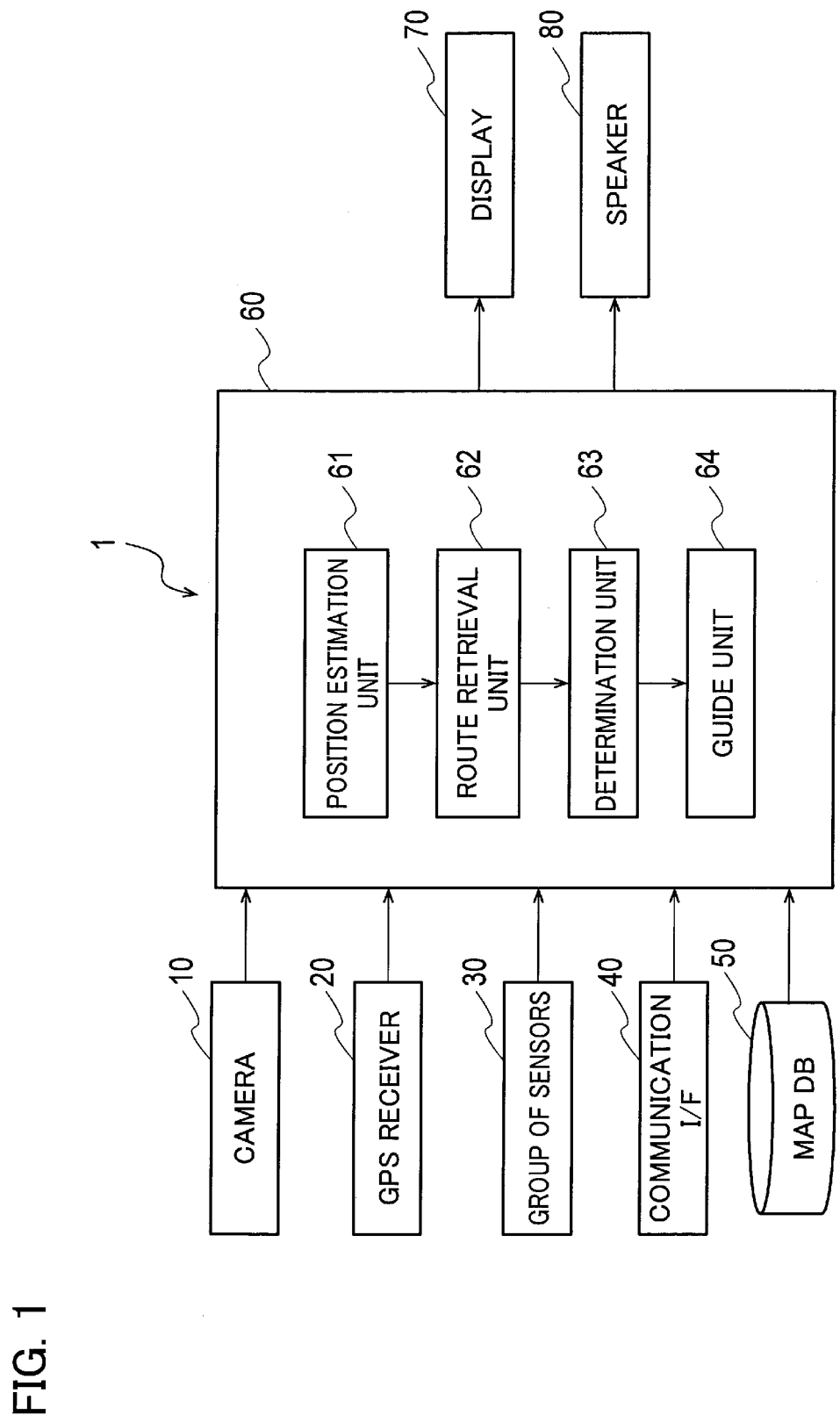

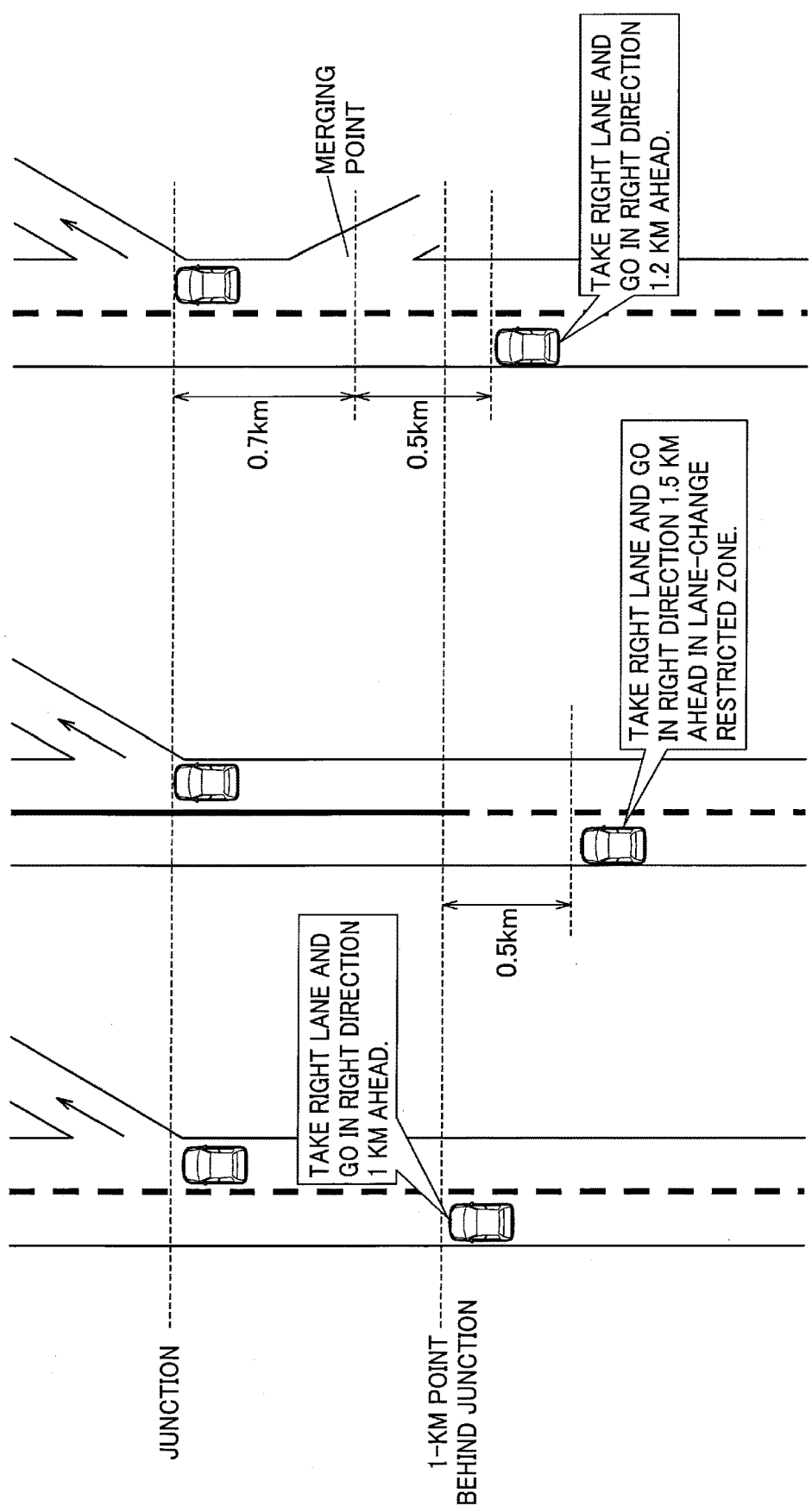

FIG. 3

| DETERMINATION OF ROAD CONDITIONS | ROAD CONDITIONS | | | GUIDANCE POINT FOR LANE CHANGE |
|---|---|---|---|---|
| NOT MEET | — | | | 1-KM POINT BEHIND JUNCTION |
| MEET | LANE-CHANGE RESTRICTED ZONE | | | 0.5-KM POINT BEHIND START POINT OF LANE-CHANGE RESTRICTED ZONE |
| | MERGING POINT (BRANCHING POINT) | MERGING POINT TO JUNCTION < 0.5 KM | | 1-KM POINT BEHIND JUNCTION |
| | | 0.5 KM < MERGING POINT TO JUNCTION < 1.5 KM | | MERGING POINT + 0.5 KM (1 KM TO 2 KM) |
| | | MERGING POINT TO NEXT JUNCTION > 1.5 KM | | 1-KM POINT BEHIND JUNCTION |
| | CURVE OR TUNNEL | | | 0.5-KM POINT BEHIND START POINT OF CURVE OR TUNNEL |

FIG. 6

| DETERMINATION OF ROAD CONDITIONS | ROAD CONDITIONS | | | GUIDANCE POINT FOR LANE CHANGE |
|---|---|---|---|---|
| NOT MEET | — | | | 1-KM POINT BEHIND JUNCTION |
| MEET | LANE-CHANGE RESTRICTED ZONE | | | 0.5-KM POINT BEHIND START POINT OF LANE-CHANGE RESTRICTED ZONE |
| | MERGING POINT (BRANCHING POINT) | MERGING POINT TO JUNCTION < 0.5 KM | | 1-KM POINT BEHIND JUNCTION |
| | | 0.5 KM < MERGING POINT TO NEXT JUNCTION < 1 KM | | MERGING POINT + 0.5 KM (1 KM TO 1.5 KM) |
| | | 1 KM < MERGING POINT TO JUNCTION < 1.5 KM | | MERGING POINT − 0.5 KM (0.5 KM TO 1 KM) |
| | | MERGING POINT TO JUNCTION > 1.5 KM | | 1-KM POINT BEHIND JUNCTION |
| | CURVE OR TUNNEL | | | 0.5-KM POINT BEHIND START POINT OF CURVE OR TUNNEL |

ROUTE GUIDANCE DEVICE AND ROUTE GUIDANCE METHOD

TECHNICAL FIELD

The present invention relates to a route guidance device and a route guidance method.

BACKGROUND

Navigation devices for indicating travel routes to destinations are known. Japanese Patent Application Publication No. 2009-133801 discloses a navigation device that, when there is a branch point on a travel route, indicates a distance to the branch point and directs a host vehicle to a lane to travel upon approaching the branch point.

According to the navigation device disclosed in Japanese Patent Application Publication No. 2009-133801, a driver can recognize the lane to travel when approaching the branch point, but is confused as to which point is appropriate to change lanes. A guidance point for urging the driver to change lanes may be preset; however, depending on road conditions, the guidance point may be located immediately in front of a merging point where the driver cannot change lanes smoothly.

SUMMARY

The present invention has been made in view of the conventional problems. An object of the present invention is to provide a route guidance device and a route guidance method for providing an appropriate point for a lane change depending on road conditions.

A route guidance device according to an aspect of the present invention detects a position of a host vehicle and a travel lane, determines whether the host vehicle should change the detected travel lane to another lane so as to travel toward a junction or an intersection on the travel route, determines whether a road between the detected position of the host vehicle and the junction or the intersection meets road conditions, and when it is determined that the host vehicle should change the travel lane to the other lane, and the road between the position of the host vehicle and the junction or the intersection meets the road conditions, changes a point to provide guidance to change lanes depending on the road conditions. The route guidance device provides the guidance to change the lanes in front of a point meeting the road conditions when a distance from the point changed depending on the road conditions to the junction or the intersection is shorter than a predetermined distance, and provides the guidance to change the lanes ahead of a point meeting the road conditions when the distance from the point changed depending on the road conditions to the junction or the intersection is longer than the predetermined distance. The road conditions include a merging point and a branching point.

The present invention can provide an appropriate point for a lane change depending on the road conditions.

BRIEF DESCRIPTION OF THE DRAWINGS

FIG. 1 is a configuration diagram of a route guidance device according to an embodiment of the present invention;

FIGS. 2(a) to 2(c) are views illustrating operations of the route guidance device according to the embodiment of the present invention;

FIG. 3 is a table for illustrating operations of the route guidance device according to the embodiment of the present invention;

FIG. 6 is a table for illustrating another operation of the route guidance device according to the embodiment of the present invention.

DETAILED DESCRIPTION OF THE EMBODIMENTS

Figure 4:
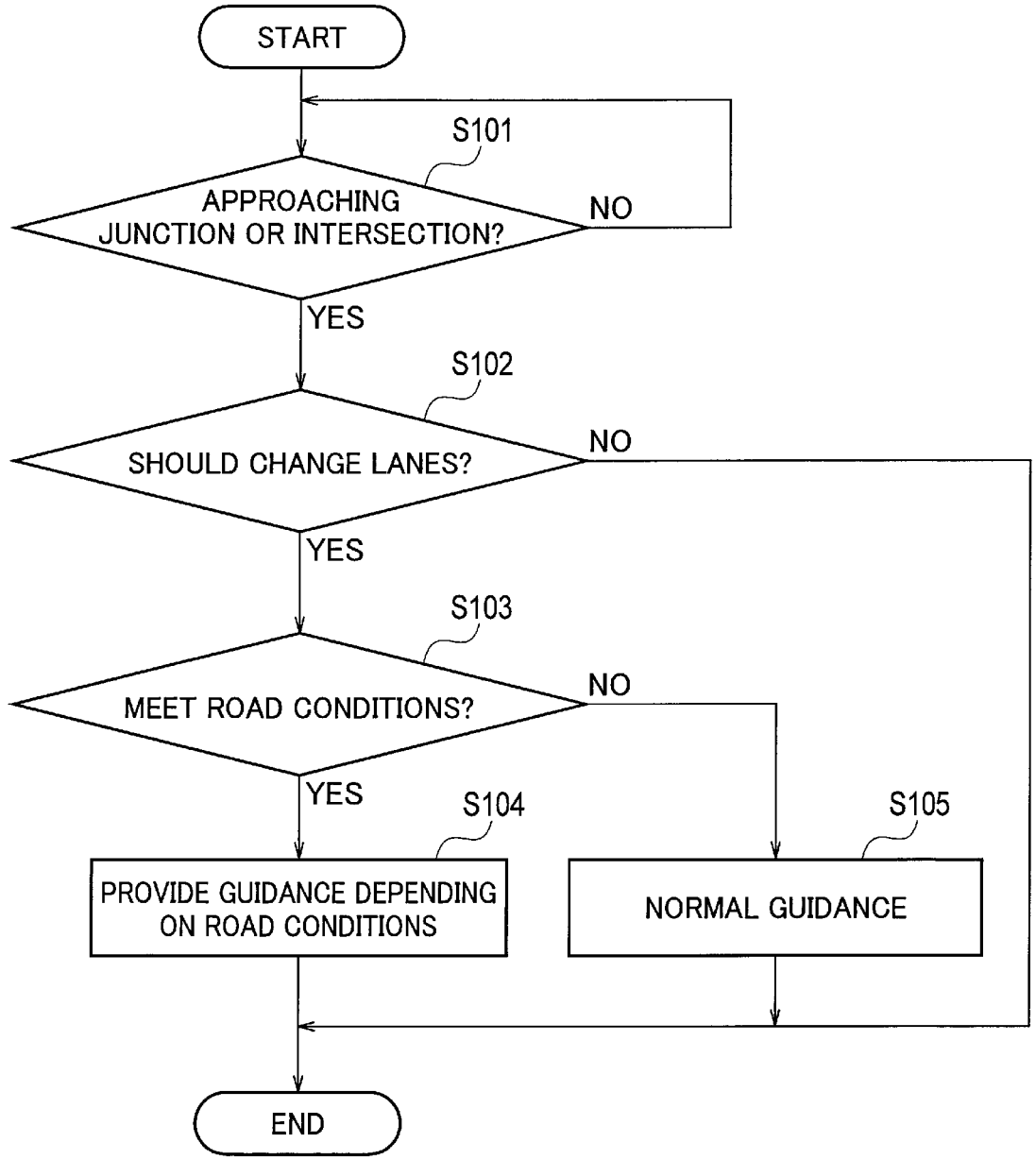
FIG. 4 is a flow chart for illustrating an operation of the route guidance device according to the embodiment of the present invention.

An embodiment of the present invention will be described below with reference to the drawings. The same elements in the descriptions of the drawings are designated by the same reference numerals, and explanations thereof are not repeated below.

A route guidance device 1 according to the present embodiment is described below with reference to FIG. 1. As shown in FIG. 1, the route guidance device 1 includes a camera 10, a GPS receiver 20, a group of sensors 30, a communication I/F 40, a map database 50, a navigation device 60, a display 70 which provides a vehicle occupant with various pieces of information, and a speaker 80 which outputs speech sounds to inform the occupant of the information.

The camera 10 (a detection unit) is a camera including an imaging device such as a charge-coupled device (CCD) and a complementary metal oxide semiconductor (CMOS), and images views in front of the host vehicle. The camera 10 has an image processing function and detects objects such as white lines from captured images. The camera 10 outputs the detected data to the navigation device 60. The camera 10 may be installed at a position where peripheral views can be captured, instead of front views.

The GPS receiver 20 (a detection unit) receives radio waves from a satellite so as to detect a current position of the host vehicle on the ground. The GPS receiver 20 outputs the detected current position of the host vehicle to the navigation device 60.

The group of sensors 30 includes a speed sensor, an acceleration sensor, and a gyro sensor. The group of sensors 30 detects a speed, a rate of acceleration, and an attitude of the host vehicle by the respective sensors, and outputs the detected data to the navigation device 60.

The communication I/F 40 is a communication device which wirelessly communicates signals with external devices. The communication I/F 40 externally receives various pieces of information, such as traffic information including traffic congestion and traffic restrictions, and weather information, through an intelligent transport system (ITS) which transmits various data in real time. The ITS includes Vehicle Information and Communication System (VICS: registered trademark) and telematics. The communication I/F 40 outputs the received information to the navigation device 60.

The map database 50 stores map information including road information and facility information. The map database 50 stores various kinds of data required for route guidance, such as road data and icon data indicated on a map. The road data stored in the map database 50 includes information about the number of lanes of roads, widths of roads, undulations of roads, and the like.

The navigation device 60 determines a travel route to a destination preliminarily set by the occupant. In particular, the navigation device 60 indicates a travel route to a destination on the display 70 or a mark denoting the current position of the host vehicle retrieved by use of the positional information acquired from the GPS receiver 20, the information acquired from the communication I/F 40, the map information acquired from the map database 50, and the like.

The navigation device 60 is a computer including a CPU, ROM and RAM, and a data path and an input/output interface connecting these elements. The CPU implements predetermined processing in accordance with programs stored in the ROM. The navigation device 60 functionally includes a position estimation unit 61, a route retrieval unit 62, a determination unit 63, and a guide unit 64.

The position estimation unit 61 estimates a current position of the host vehicle per lane. In particular, the position estimation unit 61 estimates the current position of the host vehicle per lane by use of the information about white lines acquired from the camera 10, the positional information acquired from the GPS receiver 20, and the map information acquired from the map database 50.

The route retrieval unit 62 retrieves per lane a travel route to a destination starting from the current position of the host vehicle estimated by the position estimation unit 61 by use of the map information stored in the map database 50. The route retrieval unit 62 may retrieve the travel route per lane at regular intervals, since a retrieval load increases when the travel route to the destination is retrieved per lane constantly. For example, the retrieval unit 62 may retrieve the travel route per lane when a distance to a junction or an intersection reaches three kilometers. The distance is not limited to three kilometers and may be any distance sufficient for the host vehicle to change lanes in advance. Alternatively, the retrieval unit 62 may retrieve the travel route per lane per kilometer. The distance is not limited to one kilometer when the retrieval load can be reduced.

The determination unit 63 (a change determination unit) determines whether the host vehicle should change the current traveling lane to another lane so as to travel in an appropriate direction at a junction or an intersection. For example, the determination unit 63 determines that the host vehicle does not need a lane change when the host vehicle is traveling in a single-lane road. In a case in which the host vehicle is traveling in a two-lane road, the determination unit 63 determines that the host vehicle does not need a lane change when the host vehicle is traveling on the appropriate side, or determines that the host vehicle should cross over to the other lane when the current lane is not the appropriate lane that the host vehicle should be traveling. The determination unit 63 thus determines that the host vehicle should change lanes when there are two or more lanes and the host vehicle is not in an appropriate lane to travel.

Although the timing when the determination unit 63 determines whether to change lanes is not particularly limited, the determination unit 63 may determine whether to change lanes when a distance from a current position of the host vehicle to a junction or an intersection is a predetermined distance (for example, three kilometers) or less.

The determination unit 63 (a road determination unit) determines whether a road between a current position of the host vehicle and a junction or an intersection meets predetermined road conditions. Examples of road conditions include a lane-change restricted zone, a merging point, a branching point, a curve, and a tunnel.

The guide unit 64 provides route guidance to travel at a branch point or an intersection on a travel route. For example, the guide unit 64 leads the host vehicle to an appropriate lane at a branch point where a road is branching into two directions, or leads the host vehicle to go straight, turn left, or turn right at an intersection.

The display 70 indicates a travel route to a destination set by the navigation device 60.

The speaker 80 outputs speech sounds to inform the occupant of a direction to a destination along a travel route or a direction at a junction or an intersection.

Next, examples of operations of the route guidance device 1 configured as described above are described with reference to FIGS. 2(*a*) to 2(*c*) and FIG. 3. FIG. 2(*a*) to FIG. 2(*c*) are illustrated with a case in which a lane of a road branching into a right direction is set as a travel route.

An example of an operation in a case in which a road between a current position of the host vehicle and a junction does not meet the road conditions is described below with reference to FIG. 2(*a*) and FIG. 3.

As shown in FIG. 2(*a*), when the host vehicle is approaching a junction, the route retrieval unit 62 retrieves a travel route per lane. The determination unit 63 then determines whether the host vehicle should change lanes so as to travel in the right direction at the junction. As shown in FIG. 2(*a*), when the host vehicle is traveling in the left lane and should change the lanes to travel in the right direction at the junction, the determination unit 63 determines whether the road between the current position of the host vehicle and the junction meets the road conditions, as shown in FIG. 3. When the road does not meet the road conditions, and the distance from the current position to the junction reaches a predetermined distance (for example, one kilometer), the guide unit 64 informs the driver, "Take the right lane, and go in the right direction one kilometer ahead." The present embodiment exemplifies a case, as normal guidance, in which the lane change is informed when the distance from the current position to the junction reaches one kilometer. The predetermined distance is not limited to one kilometer and may be any distance which is sufficient for the driver to change lanes safely.

An example of an operation in a case in which a road between a current position of the host vehicle and a junction meets the road conditions is described below with reference to FIG. 2(*b*) and FIG. 3.

As shown in FIG. 2(*b*), when the host vehicle is approaching a junction, the route retrieval unit 62 retrieves a travel route per lane, as in the case of FIG. 2(*a*). The determination unit 63 then determines whether the host vehicle should change lanes so as to travel in the right direction at the junction. As shown in FIG. 2(*b*), when the host vehicle is traveling in the left lane and should change the lanes to travel in the right direction at the junction, the determination unit 63 determines whether the road between the current position of the host vehicle and the junction meets the road conditions, as shown in FIG. 3. When a part of the road between the current position and the junction corresponds to a lane-change restricted zone, as shown in FIG. 2(*b*), more particularly, when the road between the one-kilometer point behind the junction where the normal guidance starts as illustrated in FIG. 2(*a*) and the junction corresponds to a lane-change restricted zone, and if the normal guidance is provided at the one-kilometer point behind the junction to inform the lane change, the host vehicle misses traveling in the appropriate direction, since the driver cannot change the lanes within the lane-change restricted zone.

To deal with such a problem, the guide unit 64 informs the driver, "Take the right lane, and go in the right direction 1.5 kilometers ahead in the lane-change restricted zone", as shown in FIG. 2(*b*). Namely, the guide unit 64 leads the host vehicle to change the lanes at the 0.5-kilometer point behind the start point of the lane-change restricted zone. When a part of the road between the current position and the junction corresponds to the lane-change restricted zone, as described above, the guide unit 64 leads the host vehicle to change the lanes in front of the start point of the lane-change restricted zone, so that the risk that the driver misses traveling in an appropriate direction can be prevented. The 0.5-kilometer point behind the start point of the lane-change restricted zone, as illustrated in FIG. 2(*b*), may be changed as appropriate.

Another example of an operation in a case in which a road between a current position of the host vehicle and a junction meets the road conditions is described below with reference to FIG. 2(*c*) and FIG. 3.

As shown in FIG. 2(*c*), when the host vehicle is approaching a junction, the route retrieval unit 62 retrieves a travel route per lane, as in the case of FIG. 2(*a*). The determination unit 63 then determines whether the host vehicle should change lanes so as to travel in the right direction at the junction. As shown in FIG. 2(*c*), when the host vehicle is traveling in the left lane and should change the lanes to travel in the right direction at the junction, the determination unit 63 determines whether the road between the current position of the host vehicle and the junction meets the road conditions, as shown in FIG. 3. When there is a merging point between the current position and the junction, as shown in FIG. 2(*c*), more particularly, when the merging point is located at the 0.7-kilometer point behind the junction, the risk increases that the host vehicle collides with a merging vehicle entering through the merging point if the normal guidance is provided to inform the lane change at the one-kilometer point behind the junction.

To deal with such a problem, when the distance from the merging point to the junction is longer than 0.5 kilometers and shorter than 1.5 kilometers, and the host vehicle reaches the 0.5-kilometer point behind the merging point, namely, reaches the 1.2-kilometer point behind the junction, as shown in FIG. 2(*c*) and FIG. 3, the guide unit 64 informs the driver, "Take the right lane, and go in the right direction 1.2 kilometers ahead." The guide unit 64 can lead the host vehicle to change the lanes at the one-kilometer to two-kilometer point behind the junction, so as to inform the driver of an appropriate point for the lane change to travel in the right direction at the junction. Since the driver can change the lanes at the 0.5-kilometer point behind the merging point, and the distance to the merging point after the lane change is longer than the case of the normal guidance, the risk of colliding with a merging vehicle entering through the merging point can be reduced. The example shown in FIG. 2(*c*) is illustrated with the case of the merging point, but may also be applicable to a case of a branching point.

As shown in FIG. 3, when the distance between the merging point and the junction is shorter than 0.5 kilometers, the guide unit 64 leads the host vehicle to change lanes at the one-kilometer point behind the junction, as in the case of the normal guidance shown in FIG. 2(*a*). The guide unit 64 thus can inform the driver of an appropriate point for the lane change so as to travel in the right direction at the junction. Since the distance from the one-kilometer point behind the junction to the merging point is 0.5 kilometers or longer, the driver can avoid the risk of colliding with a merging vehicle entering through the merging point.

As shown in FIG. 3, when the distance from the merging point to the junction is longer than 1.5 kilometers, the guide unit 64 leads the host vehicle to change lanes at the one-kilometer point behind the junction, as in the case of the normal guidance shown in FIG. 2(*a*). The guide unit 64 thus can inform the driver of an appropriate point for the lane change so as to travel in the right direction at the junction. Since the distance between the one-kilometer point behind the junction and the merging point is 0.5 kilometers or longer, the driver can change the lanes more than 0.5 kilometers ahead of the merging point, so as to avoid the risk of colliding with a merging vehicle.

As shown in FIG. 3, when there is a curve or a tunnel in a road between a current position of the host vehicle and a junction, the guide unit 64 leads the host vehicle to change lanes at the 0.5-kilometer point behind the start point of the curve or the tunnel. The guide unit 64 avoids directing the host vehicle to change the lanes in the curve or the tunnel where it is not appropriate for a lane change, so as to reduce the risk upon the lane change.

Next, an example of the operation of the route guidance device 1 according to the present embodiment is described with reference to the flow chart shown in FIG. 4. The process shown in the flow chart starts when a travel route to a destination is set.

In step S101, the determination unit 63 determines whether the host vehicle is approaching a junction or an intersection. When the host vehicle is approaching the junction or the intersection (Yes in step S101), the process proceeds to step S102. When the host vehicle is still distant from the junction or the intersection (No in step S101), the process is on standby.

In step S102, the determination unit 63 determines whether the host vehicle should change the current traveling lane to the other lane so as to travel in an appropriate direction at the junction or the intersection. When the host vehicle should change the lanes (Yes in step S102), the process proceeds to step S103. When the host vehicle does not need a lane change (No in step S102), the process is finished.

In step S103, the determination unit 63 determines whether the road between the current position of the host vehicle and the junction or the intersection meets the road conditions. When the road meets the road conditions (Yes in step S103), the process proceeds to step S104. When the road does not meet the road conditions (No in step S103), the process proceeds to step S105.

In step S104, the guide unit 64 informs the driver of a point appropriate for the lane change while changing the point depending on the road conditions.

In step S105, the guide unit 64 leads the host vehicle to change the lanes when the distance from the current position to the junction or the intersection reaches a predetermined distance.

Figure 5:
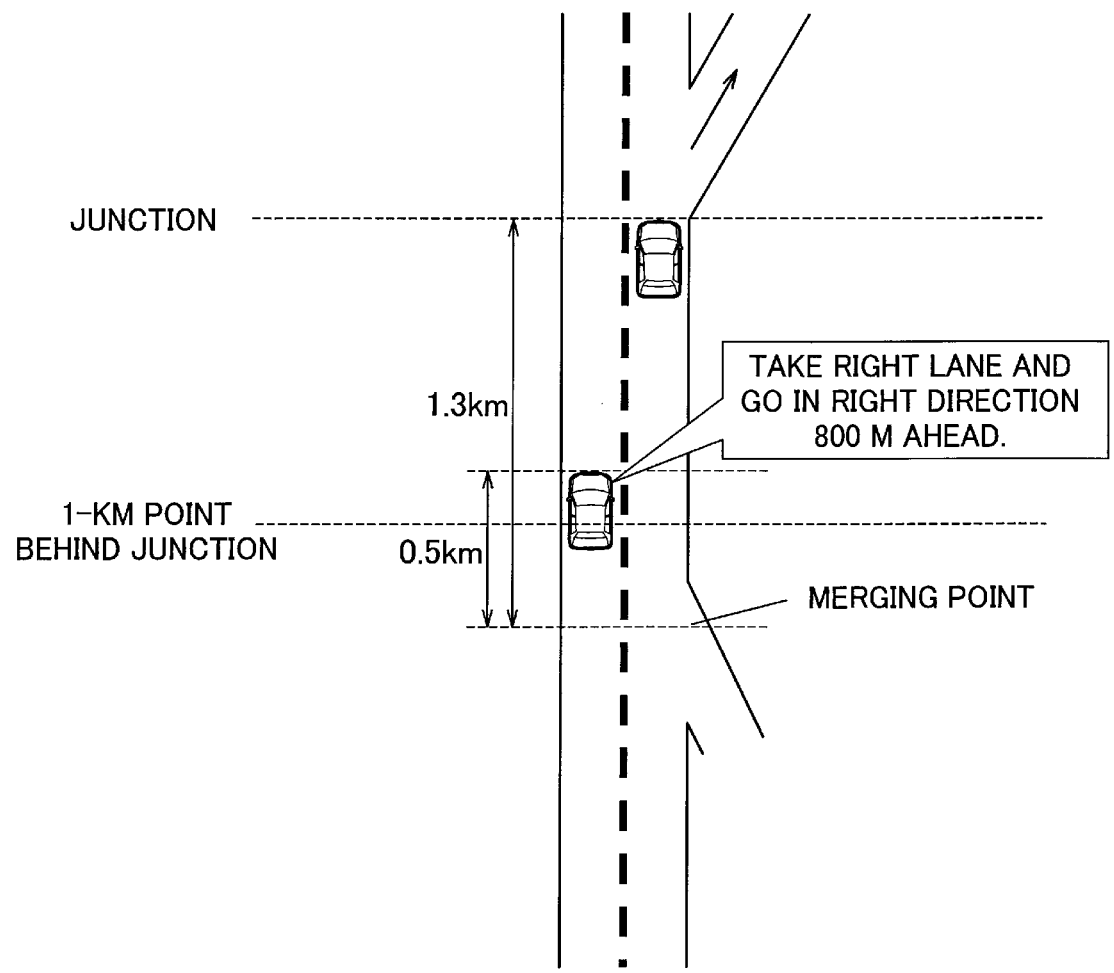
FIG. 5 is a view for illustrating another operation of the route guidance device according to the embodiment of the present invention.

FIG. 3 exemplified the case in which, when the distance from the merging point to the junction is longer than 0.5 kilometers and shorter than 1.5 kilometers, the guide unit 64 leads the host vehicle to change the lanes at the 0.5-kilometer point behind the merging point; however, the present embodiment is not limited to this case. For example, when the merging point is located at the 1.3-kilometer point behind the junction, as shown in FIG. 5, and if the guide unit 64 informs the driver of the lane change at the 0.5-kilometer point behind the merging point, the driver is to change the lanes at the 1.8-kilometer point behind the junction, which requires the driver to travel in the right lane for a longer time. When the right lane is an overtaking lane, the host vehicle preferably changes the lanes at a point closer to the junction, although a sufficient distance should be ensured to change the lanes safely.

The guide unit 64 thus sets the minimum distance to the junction at 0.5 kilometers, and changes a guidance point depending on the road conditions. For example, as shown in FIG. 5 and FIG. 6, when the distance from the merging point to the junction is longer than one kilometer and shorter than 1.5 kilometers, the guide unit 64 provides the guidance 0.5 kilometers ahead of the merging point, namely, at the 0.8-kilometer point behind the junction to inform the driver, "Take the right lane, and go in the right direction 800 meters ahead." Since the guide unit 64 can inform the driver of the lane change at the 0.5-kilometer to one-kilometer point behind the junction to ensure the minimum distance to the junction, the driver can change lanes at an appropriate point so as to travel in the right direction at the junction.

As shown in FIG. 6, when the distance from the merging point to the junction is longer than 0.5 kilometers and shorter than one kilometer, and if the driver is informed of a lane change 0.5 kilometers ahead of the merging point, the driver cannot ensure the minimum distance to the junction. The guide unit 64 thus informs the driver of the lane change at the 0.5-kilometer point behind the merging point in a case in which the distance from the guidance point changed depending on the road conditions to the junction is below the minimum distance. Since the guide unit 64 can inform the driver of the lane change at the one-kilometer to 1.5-kilometer point behind the junction to ensure the minimum distance to the junction, the driver can change lanes at an appropriate point so as to travel in the right direction at the junction. The minimum distance to the junction to be ensured is not limited to 0.5 kilometers, and may be changed as appropriate.

As described above, the route guidance device 1 according to the present embodiment can achieve the following advantageous effects.

The route guidance device 1 changes a guidance point for a lane change depending on road conditions when a road between a current position of the host vehicle and a junction or an intersection meets the road conditions. The route guidance device 1 thus can inform the driver of an appropriate point for a lane change which varies depending on the road conditions.

The road conditions include a lane-change restricted zone, a merging point, a branching point, a curve, and a tunnel. The route guidance device 1 avoids directing the host vehicle to change lanes in a curve or a tunnel where it is not appropriate for a lane change, so as to reduce the risk upon the lane change.

The route guidance device 1 informs the driver of a lane change in front of a point meeting the road conditions, namely, in front of the start point of the lane-change restricted zone, the curve, or the tunnel, or in front of the merging point or the branching point when the distance from the guidance point changed depending on the road conditions to the junction is shorter than the minimum distance. Accordingly, the route guidance device 1 can inform the driver of the point appropriate for the lane change so as to travel in the right direction at the junction while ensuring the minimum distance to the junction or the intersection.

While the embodiment of the present invention has been described above, it should be understood that the present invention is not intended to be limited to the descriptions and the drawings composing part of this disclosure. Various alternative embodiments, examples, and technical applications will be apparent to those skilled in the art according to this disclosure.

Although the present embodiment exemplified the case in which the map database 50 is stored in the route guidance device 1, the map database 50 may be stored on a server. When the map database 50 is stored on the server, the navigation device 60 can acquire the map information on demand through communications.

Figure 7:
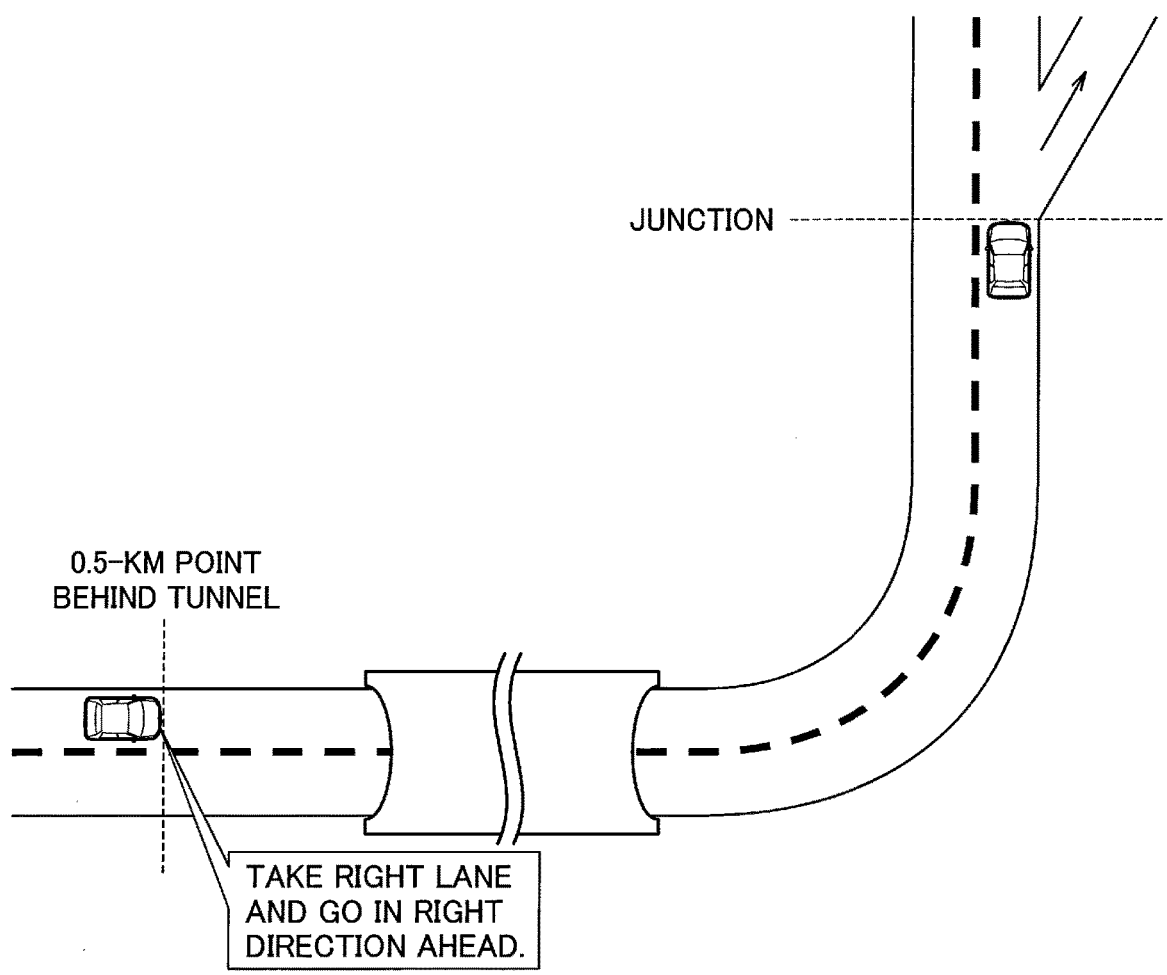
FIG. 7 is a view for illustrating yet another operation of the route guidance device according to the embodiment of the present invention.

When a road between a current position of the host vehicle and a junction meets a plurality of road conditions, the guide unit 64 may change a guidance point to change lanes according to the first road condition immediately in front of the host vehicle. For example, as shown in FIG. 7, when there are a tunnel and a curve in a road between a current position and a junction, the guide unit 64 may inform the driver of a lane change at the 0.5-kilometer point behind the start point of the tunnel, which is the first road condition closest to the host vehicle. The guide unit 64 thus can change the guidance point for a lane change according to the first road condition closest to the host vehicle, so as to avoid directing the host vehicle to change lanes in a curve or a tunnel where it is not appropriate for a lane change. Accordingly, the guide unit 64 can reduce the risk upon the lane change.

The present invention is applicable to an autonomous vehicle which is autonomously driven along a travel route. When the present invention is applied to an autonomous vehicle, the autonomous vehicle can autonomously change a point to change lanes depending on road conditions. Accordingly, the autonomous vehicle can change lanes at an appropriate point so as to travel in an appropriate direction at a junction or an intersection.

REFERENCE SIGNS LIST

10 CAMERA
20 GPS RECEIVER
63 DETERMINATION UNIT
64 GUIDE UNIT

The invention claimed is:

1. A route guidance device used for a vehicle which provides a travel route to a predetermined destination or an autonomous vehicle which is autonomously driven along the travel route, the route guidance device comprising:
   a sensor configured to detect a position of a host vehicle and a travel lane; and
   a computer configured to:
   determine whether the host vehicle should change the travel lane detected by the sensor to another lane so as to travel toward a junction or an intersection on the travel route;
   determine whether a road between the position of the host vehicle detected by the sensor and the junction or the intersection meets road conditions; and
   provide guidance about a point to change lanes,
   wherein, when the computer determines that the host vehicle should change the travel lane to the other lane, and determines that the road between the position of the host vehicle and the junction or the intersection meets the road conditions, the computer changes the point to provide the guidance depending on the road conditions,
   wherein the computer provides the guidance to change the lanes before a point meeting the road conditions when a distance from the point changed depending on the road conditions to the junction or the intersection is shorter than a predetermined distance, wherein the computer provides the guidance to change the lanes after a point meeting the road conditions when the distance from the point changed depending on the road conditions to the junction or the intersection is longer than the predetermined distance, and wherein the road conditions include either a merging point, a branching point, or a tunnel, and wherein the junction and the branching point are different points.

2. The route guidance device according to claim 1, wherein the computer changes the point to provide the guidance depending on a road condition closest to the host vehicle when the road between the position of the host vehicle and the junction or the intersection meets the road conditions.

3. A route guidance method used for a vehicle which provides a travel route to a predetermined destination or an autonomous vehicle which is autonomously driven along the travel route, the route guidance method comprising:

detecting a position of a host vehicle and a travel lane;

determining whether the host vehicle should change the detected travel lane to another lane so as to travel toward a junction or an intersection on the travel route;

determining whether a road between the detected position of the host vehicle and the junction or the intersection meets road conditions; and when it is determined that the host vehicle should change the travel lane to the other lane, and the road between the position of the host vehicle and the junction or the intersection meets the road conditions, changing a point to provide guidance to change lanes depending on the road conditions, wherein providing the guidance to change the lanes before a point meeting the road conditions when a distance from the point changed depending on the road conditions to the junction or the intersection is shorter than a predetermined distance, wherein providing the guidance to change the lanes after a point meeting the road conditions when the distance from the point changed depending on the road conditions to the junction or the intersection is longer than the predetermined distance, and wherein the road conditions include either a merging point, a branching point, or a tunnel, and the junction and the branching point are different points.

\* \* \* \* \*